United States Patent
Parkell

[15] 3,679,041
[45] July 25, 1972

[54] APPARATUS FOR THE TRANSFER OF ARTICLES

[72] Inventor: Edward F. Parkell, Horseheads, N.Y.
[73] Assignee: Dart Industries, Inc., Los Angeles, Calif.
[22] Filed: Jan. 6, 1971
[21] Appl. No.: 104,357

[52] U.S. Cl. ..............................................198/24
[51] Int. Cl. .........................................B65g 47/00
[58] Field of Search .................198/24, 25, 20; 192/150

[56] References Cited

UNITED STATES PATENTS

| | | | |
|---|---|---|---|
| 3,400,802 | 9/1968 | Rowe | 198/24 |
| 3,318,433 | 5/1967 | Rowe | 198/25 |
| 1,883,164 | 10/1932 | Vassakos | 192/150 |

*Primary Examiner*—Evon C. Blunk
*Assistant Examiner*—H. S. Lane
*Attorney*—Leigh B. Taylor, Michael L. Dunn, Harold R. Beck and Paul R. Wylie

[57] ABSTRACT

An apparatus for moving glassware through substantially a 90° angle in transferring same from a stationary platform to a moving conveyor. Such apparatus includes an extensible and retractable means operable by a dual-mounted double-acting fluid motor arrangement that is automatically responsive to the orientation of the apparatus, which orientation is controlled through a positive driving linkage with a glassware forming machine.

2 Claims, 8 Drawing Figures

INVENTOR.
EDWARD F. PARKELL
BY
Leigh B. Taylor
ATTORNEY

Patented July 25, 1972

INVENTOR.
EDWARD F. PARKELL

BY

*Leigh B. Taylor*
ATTORNEY

Patented July 25, 1972

INVENTOR.
EDWARD F. PARKELL

BY

ATTORNEY

Patented July 25, 1972

INVENTOR.
EDWARD F. PARKELL

BY

ATTORNEY

APPARATUS FOR THE TRANSFER OF ARTICLES

This invention relates to apparatus for handling glassware or the like, and more particularly concerns the moving of newly formed glassware onto a conveyor for transport to a lehr, storage or some other equipment station.

It is the general object of the invention, therefore, to provide a mechanism capable of operating in timed relationship with a glassware forming machine to move one or more articles of newly formed ware from a first position adjacent the machine to a more remote second position. Normally, such a transfer is from a platform called a deadplate onto a continuously moving conveyor in substantially aligned or otherwise predetermined order with every other glassware article that is similarly moved onto the conveyor.

Typical glassware forming machines are comprised of a plurality of sections operated by a common drive means and in timed relationship with each other so that one or more articles are placed on a deadplate in timed sequence and relationship by each respective machine section. These glassware articles are preliminarily cooled on the deadplate and are thereafter transferred from the deadplate to a continuously moving conveyor for transport to the next succeeding treatment station. To successfully accomplish the transfer mentioned, it is obvious that the mechanical means used to move the glassware from each deadplate onto the conveyor should also be similarly operated in timed relationship with their associated forming machine sections. In this fashion, one is assured of a steady flow of glassware onto the conveyor in evenly spaced relationship and without jamming.

The prior art apparatus as is described in U. S. Pats. Nos. 3,249,200; 3,249,201 and 3,400,802 has until recently fulfilled the needs of an industry in performing the functions above-described. It should be noted, however, that such constructions and especially the reciprocating head mechanism, were subject to an undue amount of wear; that the head of the apparatus could not be easily removed from service without disconnecting various other elements of the apparatus; that the lack of a positive driving arrangement between the glassware forming machine and the apparatus on occasion resulted in slippage, failure or both; and that there was no simple means of changing the amount of oscillatory motion afforded the head and reciprocating article engaging elements. The present invention alleviates and overcomes these problem areas and provides a more maintenance-free reliable mechanism for the transfer of ware from a glass-forming machine.

In keeping with the present invention, the automatically operable apparatus of this invention is associated with each glassware forming machine section and is driven by a drive means common to all such sections. This apparatus engages the glassware article or articles that have been deposited on the deadplate and then sweep the articles from the deadplate through an arcuate path onto a continuously moving adjacent conveyor at a peripheral speed substantially equal to the conveyor speed. This improved apparatus includes a more durable fluid motor having dual-mounted double-acting piston-cylinder arrangement which extend and retract article engaging elements that are positioned on the exposed piston ends. Similarly, the fluid motor and head are mounted for oscillatory movement about a substantially vertically oriented shaft at the approximate center of gravity of the head and that there is provided at the upper extremity of the shaft a plate clutch and ball detent indexing arrangement between the shaft and head. This placement of the clutch assembly adjacent the head facilitates the easy removal of the head and fluid motor for either replacement or repair.

The subsidiary driving mechanism operating between the glassware forming machine drive means and oscillatable head has also been substantially modified and improved. Such driving mechanism includes an adjustable pivot lever mounting a cam follower that acts in conjunction with a main actuating cam on the machine drive means, a toggle link connecting the lever with a crank arm on the vertically oriented shaft, and a return spring linkage also connected to the crank arm so as to continually bias it and the head to the second noted operating position. The pivot lever, of course, may be easily adjusted to varying lengths and thus, the degree of oscillation of the head may be controlled. Similarly, the links interconnecting the vertically oriented shaft to the machine drive now assure a positive transfer of motion therebetween. Accordingly, the overall reliability of the apparatus has been substantially improved.

Other uses and advantages of the invention will become more apparent from a reading of the description which proceeds with reference to the accompanying drawings forming a part thereof and wherein.

Figure 5:
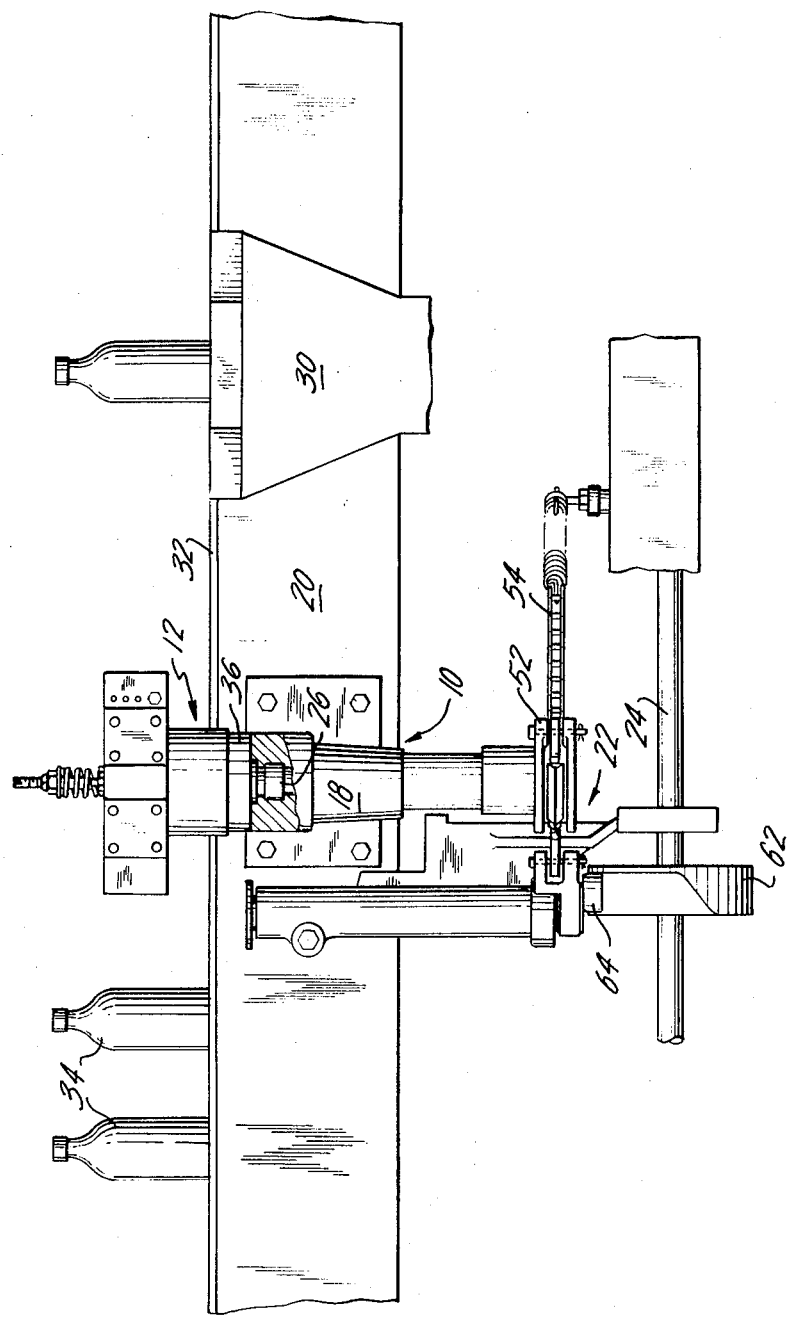
FIG. 5 is a rear elevational view of the apparatus with one part thereof shown in section to reveal certain structural details.
Figure 6:
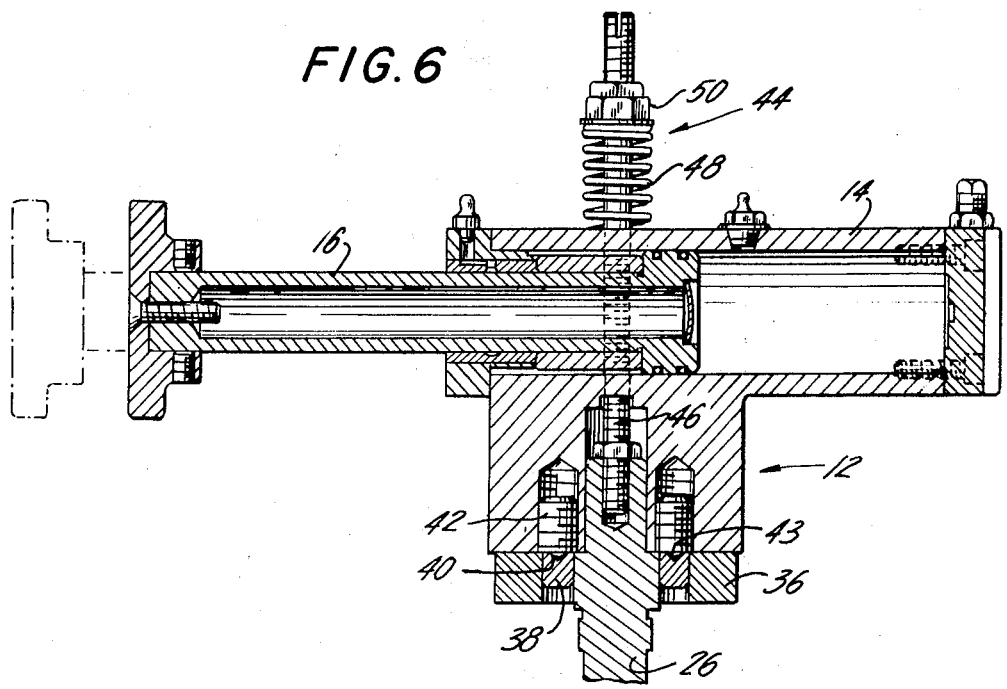
FIG. 6 is a side elevational view in cross-section of the head and fluid motor disclosing certain of the structural features thereof including the clutch mechanism.

The apparatus of this invention is best shown in FIG. 5 and is designated by reference numeral 10. As indicated, the apparatus includes an oscillatable head 12 which incorporates a reciprocable dual-mounted double-acting fluid motor having cylinders 14 and pistons and piston rods 16. The latter mentioned parts may be best seen in FIG. 6. The oscillatable head 12 is mounted at its approximate center of gravity on the upper extremity of an elongated, upstanding base 18 that may be conveniently attached to conveyor frame 20. At the lower extremity of base 18, the driving mechanism 22 interconnects the glassware forming machine drive means 24 with the head 12. Such connection to the head is effected through the vertically oriented shaft 26 which is suitable mounted for rotation in base 18.

Figure 1:
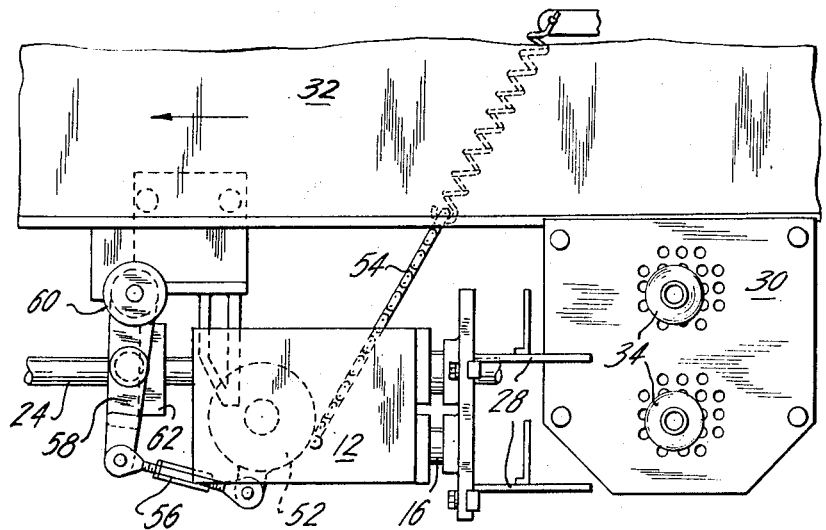
FIG. 1 is a top plan view of the apparatus provided in accordance with the present invention showing the head with the fluid motor in a retracted position facing toward the deadplate.
Figure 2:
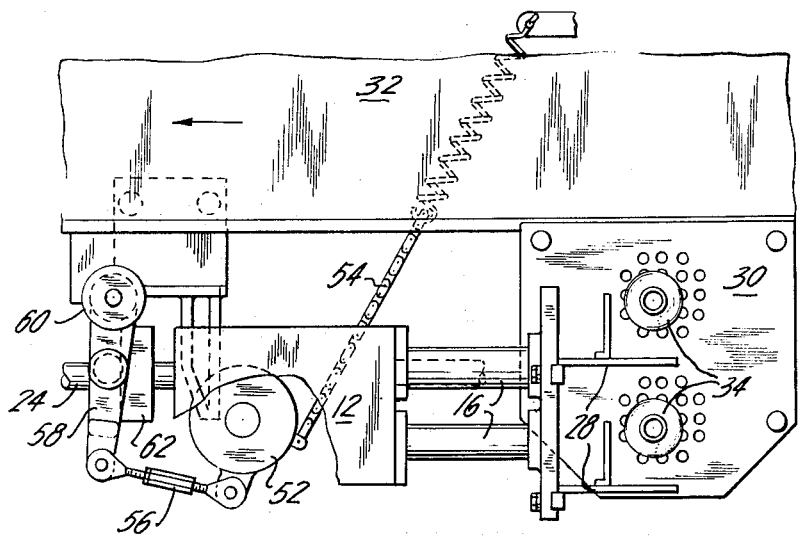
FIG. 2 is a view similar to FIG. 1 but shows the head with the fluid motor extended so as to engage the articles of glassware on the deadplate.
Figure 3:
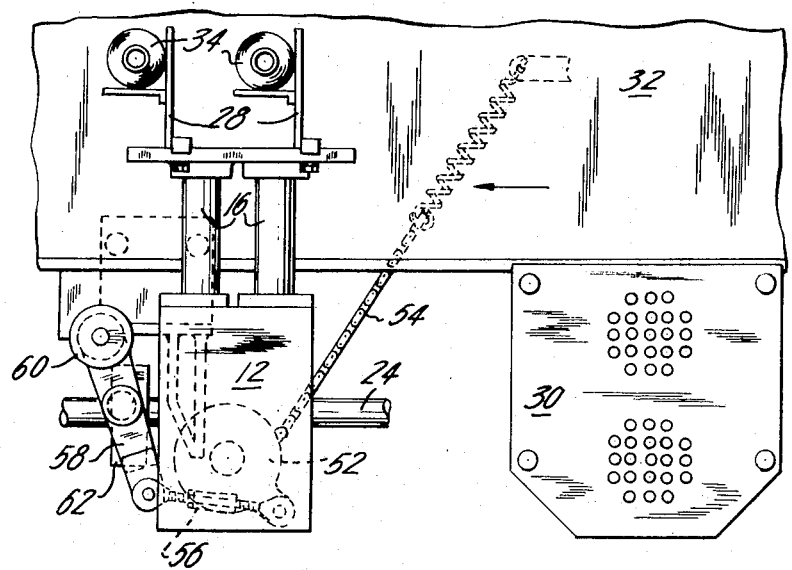
FIG. 3 is a view similar to FIGS. 1 and 2 but shows the head and fluid motor in the pivoted position facing the adjacent conveyor just subsequent to moving glassware onto the conveyor.
Figure 4:
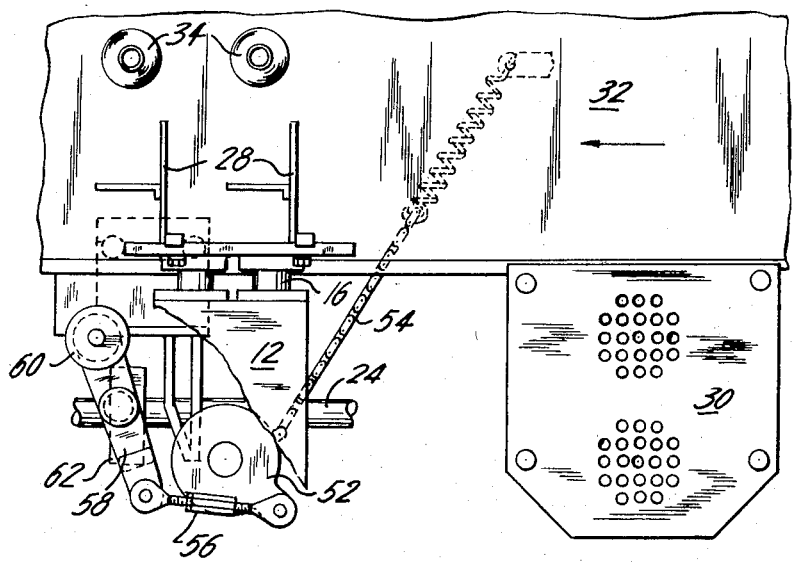
FIG. 4 is a view similar to FIG. 3 but shows the head with the fluid motor retracted but still facing the conveyor.

Referring now to FIGS. 1–4, one will readily recognize the extendible and retractable article engaging elements 28 that are securely yet removably attached to the exposed outer ends of piston rods 16. These Figs. also depict the sequence of operation of the fluid motor as it oscillates with head 12. As shown in FIGS. 1 and 2, the motor and head in their first position face towards the stationary platform or deadplate 30, and from there are pivoted to a second position facing the conveyor 32 as is shown in FIGS. 3–5. The conveyor 32 is continuously moving in the direction of the arrow and the angular rate of movement of the article engaging elements 28 is calculated to be approximately equal to the longitudinal speed of the conveyor as the head 12 moves towards the second position mentioned. Actually, the fluid motor and head 12 are oscillated between the aforesaid positions through a substantial angle of approximately 90°.

The fluid motor is a dual mounted piston and cylinder arrangement, the piston rods 16 of which are hollow. This tends to provide better support for the cantilevered article engaging elements 28, since the bending moment load is better distributed by the dual mounted motor and is minimized by the hollow piston rods. Similarly, the torsional moment is also substantially reduced and/or better accommodated and therefore machine life is substantially extended. The motor is also preferably pneumatic and, of course, double-acting so that the article engaging elements 28 may be extended and retracted simply by applying fluid pressure to the respective opposite sides of the piston 16. The various fluid transmission means for sequentially activating the motor are substantially as are described in U.S. Pat. No. 3,249,200 and are not further described herein.

The reciprocable article engaging elements 28 on piston rod 16 are adapted to engage one or more articles of glassware such as bottles 34 on the deadplate 30 upon the extension thereof and subsequent to the pivotal movement of the head 12 are adapted to retract to the position shown in FIG. 4. As is also readily apparent from FIGS. 1–4, these elements 28 include interconnected plates oriented at about 90° to one another and which thereby form a pocket or corner that will accommodate the particular glassware being transferred. As the element 28 is extended from the position shown in FIG. 1 to the position shown in FIG. 2 and the head is pivoted toward the conveyor 32, the element will sweep the articles of glassware 34 off the deadplate 30 and onto the conveyor by retaining such articles in the element pockets or corners referred to above. The element is thereafter retracted as is shown in FIG. 4 so that it will not be in a position to interfere with the movement of other articles of glassware on the conveyor or on the deadplate as the head is pivoted back to the position shown in FIG. 1.

It should be understood that the article engaging elements 28 may be of many varying forms and sizes to accommodate various types of glassware. Similarly, these elements may be adjustable for the same purpose.

The means for pivoting or oscillating the fluid motor and head 12 between its first and second position includes a vertically oriented shaft 26 (FIGS. 5 and 6) which is journaled in the elongated upstanding base 22. The head 12 is secured to the upper end or extremity of the shaft 26 through a clutch plate 36. Especially with reference to FIG. 6, it will be apparent that the head 12 is positioned on the shaft 26 at its approximate center of gravity. This placement, of course, further balances the overall mechanism and thereby also minimizes wear throughout the device. The prior art devices were constructed so that an offset loading resulted in excessive machine wear. Also, as can be seen from FIG. 5, the location of the clutch assembly, adjacent to top of conveyor 32, makes it readily accessible for disassembly in the event of any malfunction in the apparatus.

The clutch assembly includes a plurality of ball buttons 38 suitably mounted flush with the top surface of clutch plate 36. These buttons each have a spherical cavity 40 which is adapted to mate with a similar cavity in each of the ball plungers 42 that are threaded into head 12. As is obvious, these mating cavities each retain a suitably shaped bearing element 43 and these function to provide for indexing between the plate 36 and the head 12.

The clutch plate is fixedly attached to shaft 26; however, the head 12 is free to rotate with respect thereto. Driving attachment is made between the plate and head through a holding means 44 that biases the head 12 into interfacial relationship with the clutch plate 36. As indicated above, the relative position between the plate and head is determined by the ball detent means described. Such means, however, does not effect the driving relationship between the two, thus excessive wear is also reduced here. The holding means 44 includes a shaft 46 that is threaded into shaft 26 and extends upwardly through, between and above the double mounted pistons and cylinders in the head 12. A suitable spring 48 mounts over the shaft 46 and is compressed against the head 12 by locking nut arrangement 50. As can be seen from FIG. 5, this spring compression biases the plate and head together at the interface therebetween. It is this interfacial frictional contact that provides the necessary driving relationship between the head 12 and plate 36. If, however, a glassware jam occurs such that the head is prevented from pivoting properly, the continued rotation of shaft 26 by the driving mechanism will produce only a slippage between the plate and head and the elements 43 will be simply cammed out of cavities 40 and up onto the surface of clutch plate 36. Thus, a relative rotation will occur between plate 36 and the head 12 and no undue strain will be placed on the driving mechanism for the apparatus.

At the lower extremity of shaft 26, there is attached a crank arm 52. A chain and spring return mechanism 54 is attached to arm 52 such that it tends to bias the arm, shaft 26 and head 12 toward and to the position shown in FIGS. 3 and 4. Similarly, a connecting link 56 is pinned to the arm 52 and to the adjustable pivot lever 58 so that as lever 58 oscillates about its pivot point 60, that motion will be translated into the rotary movement of shaft 26. The oscillation of adjustable pivot lever 58 is controlled by the rotation of drive means 24 which carries a cam 62. The cam 62 is constructed and so positioned on drive means 24 that it will move cam follower 64 in properly timed relationship with the production of glassware in the forming machine and thereby oscillate head 12 accordingly. The cam slopes on cam 62 are designed to provide a speed of arcuate movement which is coordinated with the linear speed of the conveyor. Therefore, as mentioned above, the peripheral speed of the glassware carried by elements 28 is substantially matched to the speed of the conveyor so as to minimize the possibility of toppling the glassware articles.

Figure 7:
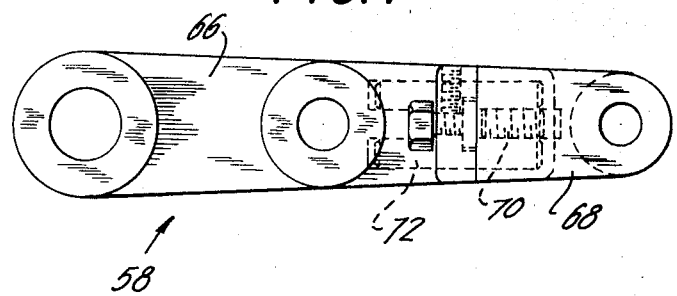
FIG. 7 is a top plan view of the pivot lever which in part connects the machine drive mechanism to the head and fluid motor and initiates the oscillatory motion afforded thereto.
Figure 8:
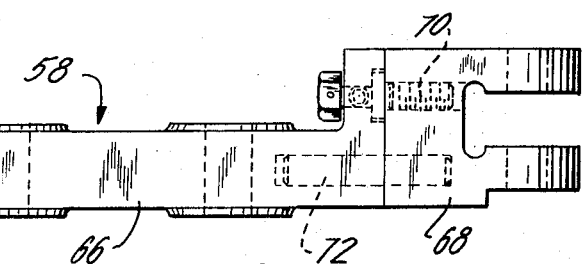
FIG. 8 is a side elevational view of the pivot lever shown in FIG. 7.

As indicated above, the pivot lever 58 is adjustable and may therefore be lengthened or shortened to vary the degree of pivotal movement afforded to head 12. FIGS 7 and 8 depict this lever in more detail and as can there be seen, such is of two piece construction and includes pivot part 66, which is attached to the conveyor frame 20 at point 60, and adjustable part 68. Part 68 may be extended away from or drawn toward part 66 simply by rotating shouldered bolt 70 out of or into part 68. Guide pins 72 are provided to further interconnect the parts and to rigidify the overall pivot lever structure.

To reiterate, in operation the article engaging elements 28 are extended automatically whenever the head 12 and fluid motor face the deadplate 30. After extension, the cam and cam follower mechanism swing the head 12 (counterclockwise as viewed in FIGS. 1–4) to a position facing the conveyor 32. When the arc of the swing has been completed so that the head 12 is in the position shown in FIGS. 3, the elements 28 will be automatically retracted. After such retraction, the head 12 returns through camming action to its first position facing the deadplate 30 and the apparatus is ready to be recycled through the same sequence of operations. As indicated, the reliability of such operation is substantially improved by the apparatus construction hereinabove described.

I claim:

1. Apparatus adapted for use with a glassware forming machine and wherein said apparatus is provided to move glassware formed by said machine away from a first position adjacent thereto to a second position removed therefrom and comprising a head oscillatable from said first position to said second position, an elongated upstanding base upon the upper extremity of which is mounted a clutch plate to which said head is attached in an interfacial relationship, said plate and head being attached at a point along their respective longitudinal centerlines and including a plurality of mating cavities that accommodate suitably shaped bearing elements therein to relatively position the plate and head without re-enforcing said interfacial relationship and which are capable of relative rotation with respect to one another, holding means biasing said head and plate together in said interfacial relationship, drive means for oscillating the head between said first and second positions, and dual-mounted double-acting pistons movably mounted within said head for extending and retracting directly attached article engaging elements which in turn are adapted to abut glassware and sweep same from said first position to said second position.

2. Apparatus as is described in claim 1 wherein said drive means includes a shaft extending upwardly through said base, means fixedly attaching said clutch plate thereto adjacent its uppermost extremity, and additional means extending through and above said head for attaching same to said shaft and biasing the plate thereagainst and into said interfacial relationship.

* * * * *